United States Patent
Henderson et al.

[11] Patent Number: 6,011,595
[45] Date of Patent: Jan. 4, 2000

[54] METHOD FOR SEGMENTING A DIGITAL IMAGE INTO A FOREGROUND REGION AND A KEY COLOR REGION

[75] Inventors: Todd R. Henderson, Conesus; Kevin E. Spaulding, Spencerport; Douglas W. Couwenhoven, Fairport, all of N.Y.

[73] Assignee: Eastman Kodak Company, Rochester, N.Y.

[21] Appl. No.: 08/934,373

[22] Filed: Sep. 19, 1997

[51] Int. Cl.$^7$ ........................................ H04N 9/75
[52] U.S. Cl. .................... 348/590; 348/586; 348/587; 382/164
[58] Field of Search ................. 348/590, 586, 348/587, 592, 593, 239, 591, 652, 653, 584, 585, 598, 599; 382/164, 165, 173; 358/538, 464; H04N 5/222, 9/74, 9/75

[56] References Cited

U.S. PATENT DOCUMENTS

| | | | |
|---|---|---|---|
| 4,393,394 | 7/1983 | McCoy | 348/587 |
| 4,500,919 | 2/1985 | Schreiber | 358/78 |
| 4,533,937 | 8/1985 | Yamamoto et al. | |
| 4,589,013 | 5/1986 | Vlahos et al. | 358/22 |
| 4,630,101 | 12/1986 | Inaba et al. | 348/587 |
| 4,725,879 | 2/1988 | Eide et al. | 348/35 |
| 5,070,397 | 12/1991 | Wedderburn-Bisshop | 358/22 |
| 5,087,965 | 2/1992 | Torre-Bueno | 358/22 |
| 5,196,922 | 3/1993 | Yeomans | 348/578 |
| 5,251,016 | 10/1993 | Delwiche | 358/22 |
| 5,258,843 | 11/1993 | Truong | 358/183 |
| 5,264,933 | 11/1993 | Rosser et al. | 348/578 |
| 5,313,275 | 5/1994 | Daly et al. | 348/592 |
| 5,355,174 | 10/1994 | Mishima | 348/592 |
| 5,381,184 | 1/1995 | Gehrmann . | |
| 5,436,671 | 7/1995 | Gehrmann | 348/587 |
| 5,455,633 | 10/1995 | Gehrmann . | |
| 5,461,493 | 10/1995 | Venable | 358/520 |
| 5,491,517 | 2/1996 | Kreitman et al. | 348/581 |
| 5,583,666 | 12/1996 | Ellson et al. | 358/518 |
| 5,630,037 | 5/1997 | Schindler | 395/131 |
| 5,689,437 | 11/1997 | Nakagawa | 345/421 |
| 5,724,442 | 3/1998 | Ogatsu et al. | 382/167 |
| 5,731,846 | 3/1998 | Kreitman et al. | 348/581 |
| 5,764,306 | 6/1998 | Steffano | 348/586 |
| 5,764,357 | 6/1998 | Dockser | 358/261.1 |
| 5,768,412 | 6/1998 | Mitsuyama et al. | 382/173 |
| 5,812,214 | 9/1998 | Miller | 348/587 |
| 5,828,779 | 10/1998 | Maggioni | 382/165 |
| 5,852,673 | 12/1998 | Young | 382/164 |

FOREIGN PATENT DOCUMENTS

| | | | |
|---|---|---|---|
| 0285494A1 | 10/1988 | European Pat. Off. | H04N 9/75 |
| 0590997A2 | 4/1994 | European Pat. Off. | G06F 15/72 |
| 404070293A | 3/1992 | Japan | H04N 9/75 |
| 407131817A | 5/1995 | Japan | H04N 9/75 |
| 411027691A | 1/1999 | Japan | H04N 9/75 |
| 411027692A | 1/1999 | Japan | H04N 9/75 |
| 411027693A | 1/1999 | Japan | H04N 9/75 |
| 2223644A | 4/1990 | United Kingdom | H04N 9/75 |
| 2262860A | 6/1993 | United Kingdom | H04N 9/75 |
| 2263040A | 7/1993 | United Kingdom | H04N 9/75 |

*Primary Examiner*—Andrew I. Faile
*Assistant Examiner*—Uyen Le
*Attorney, Agent, or Firm*—Raymond L. Owens

[57] ABSTRACT

A method for segmenting a digital image into a foreground region and a key color region including characterizing a distribution of key color values; using the distribution of key color values to produce a multi-dimensional look-up-table having three or more dimensions indexed by color values in a selected color space to define a key color volume; addressing the multi-dimensional look-up table with color values of pixels in the digital image to determine whether the color values of such pixels are within the key color volume; and labeling pixels in the digital image whose color values fall within the key color volume to be within the key color region and labeling all other pixels to be within the foreground region whereby the digital image is segmented into the foreground region and the key color region.

38 Claims, 5 Drawing Sheets

METHOD FOR SEGMENTING A DIGITAL IMAGE INTO A FOREGROUND REGION AND A KEY COLOR REGION

CROSS REFERENCE TO RELATED APPLICATIONS

The present invention is related to commonly assigned U.S. patent application Ser. No. 08/934,372 filed Aug. 19, 1997, entitled "Method For Computing a Control Signal For Combining Digital Images" to Todd R. Henderson et al., and commonly assigned U.S. patent application Ser. No. 08/934,178 filed Aug. 19, 1997, entitled "Method For Combining a First Digital Image and a Second Background Digital Image" to Todd R. Henderson et al., assigned to the assignee of the present invention. The disclosure of these related applications is incorporated herein by reference.

FIELD OF THE INVENTION

This invention pertains to the field of digital imaging, and more particularly to an image segmentation method used during the process of combining a foreground image and a background image.

BACKGROUND OF THE INVENTION

Many different types of so-called "special-effects" can be created using digital imaging techniques. One such class of special-effects techniques involves inserting the foreground of one image into a different background image. This makes it possible for a person or object to appear to be in a different setting than they really are. For example, the weatherman can appear to be standing in front of a weather map, when in reality he is standing in front of a blue wall, or an actor can appear to be standing on the edge of a cliff, when in reality he is actually performing in the safety of a studio. Typically, these methods rely on having the foreground object photographed in front of a brightly colored backdrop of a known color. A common backdrop color is blue, which is why this technique is often referred to as "blue-screening."

The basic steps involved with implementing a typical blue-screening algorithm are illustrated in FIG. 1. First, an object is photographed in front of a brightly colored backdrop of a known color which is shown as an image capture step 10. The captured image will contain a foreground region corresponding to the object being photographed, and a key color region, corresponding to the brightly colored backdrop. The key color region has a predetermined key color such as bright green or bright blue.

A segmentation step 12 is next used to segment the captured image into the foreground region and the key color region by detecting portions of the image having the key color. Since the color of the backdrop will not be perfectly constant, the key color will typically be characterized by a range of color values surrounding some nominal color value, rather than a single point in color space.

Many blue-screening algorithms also include a transition signal creation step 14. This is useful because the image will typically contain some foreground pixels that have been contaminated by the key color. For example, the pixels that occur along the boundary between the foreground region and the key color region usually contain a mixture of foreground color and key color. The transition signal is determined to indicate the relative amount of foreground color and key color contained in each contaminated pixel.

Finally, an image composition step 16 is used to combine the foreground region of the captured image with a second background image. During this step, the foreground region of the captured image is inserted into the background image. For the foreground pixels that were determined to be contaminated with the key color, the transition signal can be used to remove the appropriate amount of the key color and replace it with the corresponding background image.

Several methods have been disclosed in the prior art for the image segmentation step 12 shown in FIG. 1. These methods generally involve converting the image data into a luminance-chrominance color space representation such as the well-known YCrCb or CIELAB color spaces. A key color zone is then defined relative to the chrominance coordinates so that image colors that fall within this key color zone will be classified as belonging to the key color region. Examples of typical key color zones that can be found in the prior art are shown in FIG. 2. (These examples were taken from U.S. Pat. Nos. 4,533,937, 5,381,184 and 5,455,633.) In each of these examples, the key color zone is indicated by a cross-hatched area in a Cr-Cb chrominance plane. FIG. 2(a) shows a half-plane key color zone 20, FIG. 2(b) shows a circular key color zone 22, FIG. 2(c) shows a wedge shaped key color zone 24, and FIG. 2(d) shows a diamond key color zone 26.

The prior art key color zones shown in FIG. 2 are all defined relative to the chrominance coordinates, and are therefore independent of the Y luminance value, so that color values in the image at all brightness levels are segmented using the same zone boundary. In cases where the key color backdrop is illuminated uniformly, the key color zone can usually be identified quite accurately. This is frequently done by capturing an image of the key color backdrop with no foreground objects in place. However, when objects are actually placed in front of the backdrop, the effective color of the key color backdrop will change somewhat. This is due to the presence of shadows cast onto the key color backdrop by the subject, or other causes such as secondary illumination of the backdrop by light reflected off the foreground objects. As a result, the key color zone typically needs to be large enough to include both the shadowed and unshadowed regions of the key color backdrop.

Actual object colors that fall within the key color zone will also be classified as belonging to the chroma key region. This is sometimes referred to as a "false positive" error. When a false positive error occurs, some region of the foreground object will be classified as key color, and will therefore be replaced with the background image during the image composition step 16. For example, if the weatherman were wearing a tie that was the same color as the key color backdrop, the weather map in the background would appear to show through a tie-shaped hole in his chest.

For television and movie studio applications, these false positive errors are usually avoided by carefully controlling the colors that occur in the foreground objects. Therefore, the weatherman would never be permitted to wear a tie that matched the color of the key color backdrop. However, in other applications it is not possible to have tight control over the foreground colors. For example, if a kiosk were set up in an amusement park to produce composite pictures of customers posed in front of a variety of backgrounds, the system operator will not have any control over the color of the clothing that the customers will be wearing. As a result, the probability of false positive errors occurring increases substantially. Therefore, in these cases, it is critical that the key color zone be made as small as possible. However, as explained earlier, the prior art implementations require a large key color zone to handle conditions such as shadows.

Additionally, the fact that the chroma key zones are defined relative to the two-dimensional chrominance coordinates makes it impossible to account for the fact that the key color will actually be characterized by a three-dimensional volume in color space.

SUMMARY OF THE INVENTION

It is an object of the present invention to provide a method for overcoming the above deficiencies, and which reduces the number of false positive errors.

It is another object of the present invention to provide an improved image segmentation method that can be used to identify key color regions in a digital image having a foreground region and a key color region.

These objects are achieved by a method for segmenting a digital image into a foreground region and a key color region comprising the steps of:

a) characterizing a distribution of key color values;

b) using the distribution of key color values to produce a multi-dimensional look-up-table having three or more dimensions indexed by color values in a selected color space to define a key color volume;

c) addressing the multi-dimensional look-up table with color values of pixels in the digital image to determine whether the color values of such pixels are within the key color volume; and d) labeling pixels in the digital image whose color values fall within the key color volume to be within the key color region and labeling all other pixels to be within the foreground region whereby the digital image is segmented into the foreground region and the key color region.

These objects are also achieved by a method for segmenting a digital image into a foreground region and a key color region comprising the steps of:

a) characterizing a distribution of key color values;

b) using the distribution of key color values to define a key color volume in a selected color space where the key color volume is characterized by a range of hue angles and a range of chroma values wherein at least one of such ranges is a function of a luminance value; and c) labeling pixels in the digital image whose color values fall within the key color volume to be within the key color region and labeling all other pixels to be within the foreground region whereby the digital image is segmented into the foreground region and the key color region.

These objects are also achieved by a method for segmenting a digital image into a foreground region and a key color region comprising the steps of:

a) characterizing a distribution of key color values;

b) using the distribution of key color values to define a key color volume in a selected color space;

c) enlarging such key color volume such that it includes key color values corresponding to shadowed key color regions in the digital image; and d) labeling pixels in the digital image whose color values fall within the key color volume to be within the key color region and labeling all other pixels to be within the foreground region whereby the digital image is segmented into the foreground region and the key color region.

ADVANTAGES

The present invention has an advantage over the prior art in that it provides for a more accurate specification of the key color volume. This reduces the occurrences of classification errors where foreground regions are misclassified as key color regions. In particular, the use of a multi-dimensional look-up table, or a luminance dependent hue angle/chroma range model provides the ability to account for variations in the shape of the key color volume as a function of luminance level.

Another advantage of the present invention is that shadowed key color regions can be correctly classified as key color regions, without substantially increasing the occurrence of classification errors.

DETAILED DESCRIPTION OF THE INVENTION

This invention can be applied to digital images captured by a digital still camera, a video camera, or other sources of digital images such as scanned photographs or scanned photographic negatives. The desired improvement is accomplished by defining a key color volume in a selected color space that fits a characterized distribution of key color values as tightly as possible. To achieve this goal, key color volumes are defined where the shape of the key color volume varies with luminance level to reflect the three-dimensional nature of the distribution of key color values. A tightly fitting key color volume will minimize the occurrence of false positive errors that occur when portions of the foreground region are mistakenly identified as belonging to the key color region.

Figure 1:
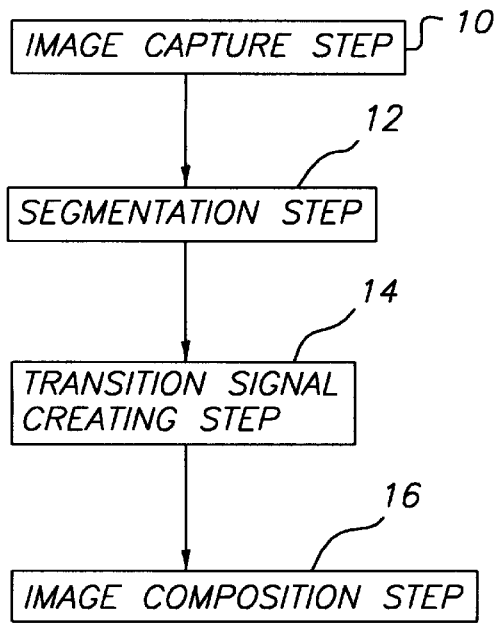
FIG. 1 is a flow diagram illustrating a prior art method for compositing two images.
Figure 3:
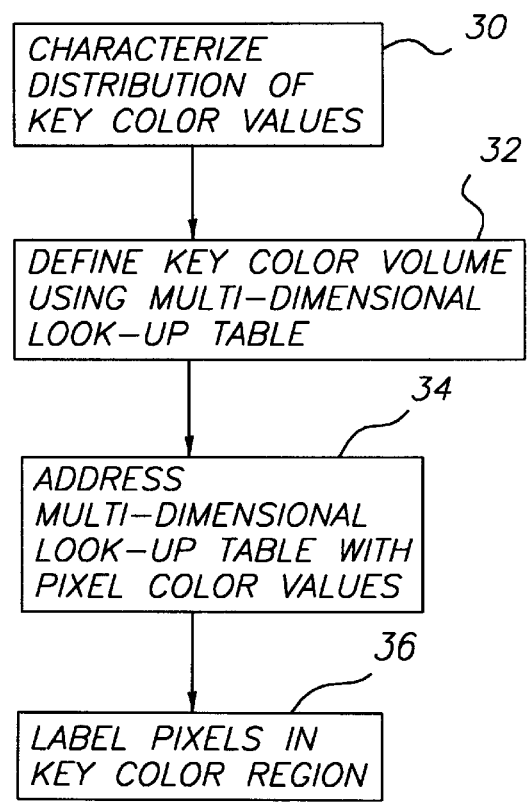
FIG. 3 is a flow diagram illustrating one preferred embodiment of the present invention.
Figure 2A:
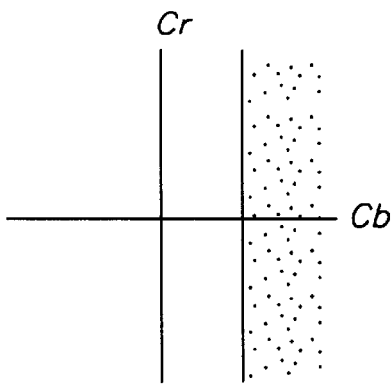
FIG. 2 (a) through (d) illustrate a number of prior art key color zones.
Figure 2B:
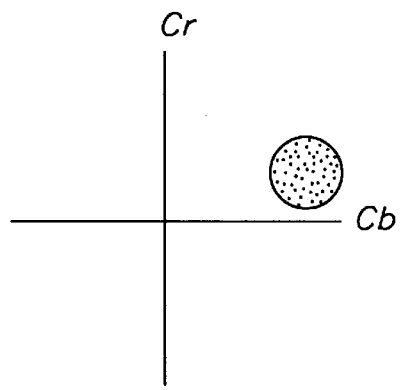
Figure 2C:
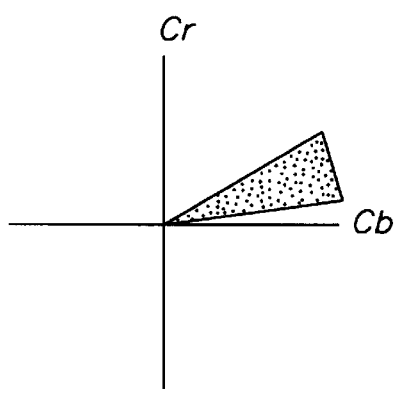
Figure 2D:
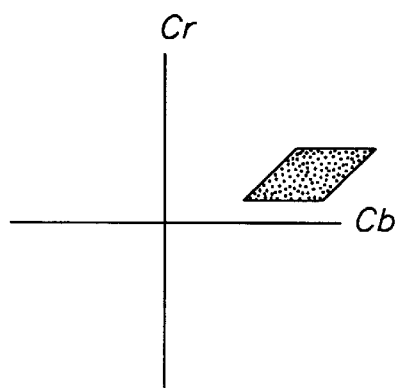

A series of steps associated with one preferred embodiment of the present invention is shown in FIG. 3. First, a key color value distribution characterization step 30 is performed. The purpose of this step is to determine the distribution of key color values that will occur in an image. From this distribution of key color values, a key color volume defining step 32 is used to populate a multi-dimensional look-up table which is used to indicate whether a color value is within the key color volume. The color values for pixels in the digital image are then supplied as input to a multi-dimensional look-up table addressing step 34. The output values from the multi-dimensional look-up table are then used to label the pixels in the digital image using a pixel labeling step 36. In particular, the pixels whose color values fall within the key color volume will be labeled as belonging to the key color region.

We will now consider each of these steps in more detail. In accordance with the present invention, the key color value distribution characterization step 30 can be produced in a number of different ways. In a preferred embodiment of this invention a calibration image is captured where the frame is filled with only the key color backdrop, and no foreground objects are present in the scene. The color values in the calibration image will then be representative of the color values that will be expected in the key color region of mixed images that also contain foreground objects. In some cases, it may be desirable to use every pixel in the calibration image to characterize the distribution of key color values. In other cases, it may be desirable to use only a subset of the pixels in the calibration image. For example, every other pixel can be used, or pixels near the edges of the image can be ignored. In one embodiment of this invention, the distribution of key color values can be characterized by simply storing a list of key color values. Alternatively, some statistical measures of the key color distribution can be calculated. For example, the range of color values can be determined, or the centroid and the standard deviations of the distribution can be computed.

Another method of characterizing the distribution of key color values would involve identifying a subset of the key color region in a mixed image containing both a foreground region and a key color region. The subset can be identified by having a user select an area of the image using some sort of pointing device such as a mouse, or a cursor. Alternatively, an automatic subset detection means can be employed. Once the subset of the key color region is identified, the distribution of key color values can be characterized in a manner similar to that discussed above for the calibration image.

Yet another method of characterizing the distribution of key color values would be to provide a set of user adjustable parameter values that describe the distribution of key color values. For example, the user might have "knobs" that can be used to adjust the centroid and standard deviations of the key color distribution. The "knobs" in this case might be physical knobs, or alternatively can be slide-bars, or other graphical user interface elements in a software application. In this case, it is typically desirable to permit the user to adjust the parameter values and monitor the results of the segmentation process in real time in order to determine a set of acceptable parameter values.

The distribution of key colors can be characterized relative to many different color spaces. For example, digital images are frequently represented in RGB or CMYK color spaces. Alternatively, it is frequently desirable to represent the color values in a color space comprised of a luminance value and two chrominance values. These types of color spaces are often well-suited to image segmentation operations. Examples of luminance-chrominance color spaces include the well-known $YC_rC_b$ color space, as well as the CIELAB and CIELUV color spaces defined by the Commission International de l'Éclairage. In the example implementation presented here, the $YC_rC_b$ color space is used. However, it should be recognized that the choice of color space is not fundamental to the invention, and that any color space can be used in an actual implementation. For example, it may be advantageous, in some applications, to characterize the key color volume in the RGB color space of the input digital image so that additional color transformations can be avoided.

Figure 4:
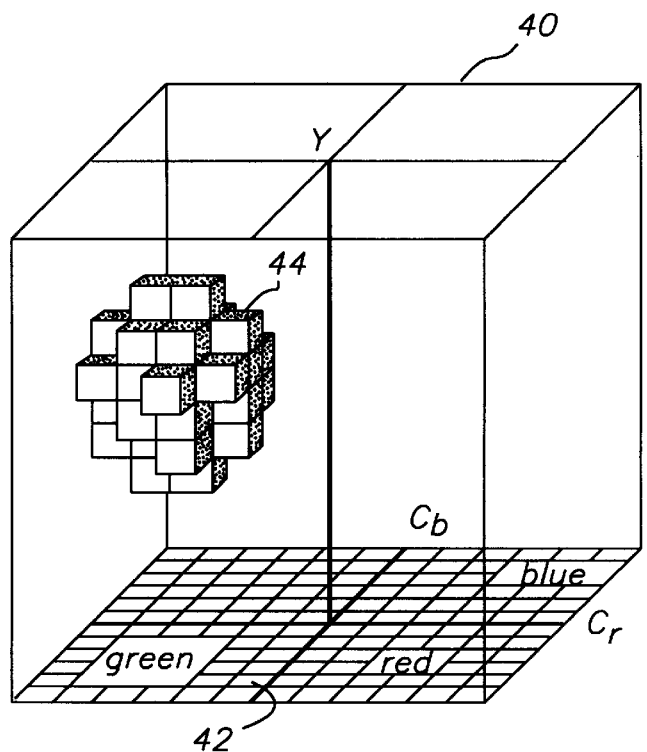
FIG. 4 is a diagram illustrating a key color volume characterized by a three-dimensional look-up table.

Next the key color volume defining step 32 will be described in more detail. The object of this step is to define the key color volume using a multi-dimensional look-up table. The multi-dimensional look-up table is addressed by the color values of the image in the selected color space (e.g., $YC_rC_b$). The multi-dimensional look-up table stores a value that indicates whether the associated color value which is used to address the multi-dimensional look-up table is within the key color region. An example of a multi-dimensional look-up table 40 is shown schematically in FIG. 4. In this case, the look-up table is three-dimensional since a three-dimensional color space ($YC_rC_b$) is used to address the look-up table. The three indices of the look-up table are the three input color values, Y, $C_r$, and $C_b$. The three-dimensional look-up table can be viewed as a three-dimensional lattice of cells. For illustration purposes, the example shown in FIG. 4 shows 12 look-up table cells 42 in the $C_r$ and $C_b$ directions. In an actual implementation, it may be desirable to use a larger or smaller number of cells. The multi-dimensional look-up table stores a value which indicates whether a certain color value is inside the key color volume. For example, the look-up table might store a 1 for color values within the key color volume, and a 0 for color values outside the key color volume. In FIG. 4, a key color volume 44 is shown corresponding to a green key color. The look-up table cells that correspond to the key color volume are shown as cross-hatched cubes. The remainder of the cells (which are not shown on the figure for clarity) would correspond to color values outside the key color volume.

In some cases it may be desirable to use multi-dimensional look-up tables that only span the range of color values corresponding to the range of color values contained within the key color volume. For example, if the key color volume only spans Y values in the range of 100 to 150, the look-up table only needs to be addressed by color values that fall within this range. If a color value has a Y value outside the range of look-up table indices, it would therefore be classified as being outside the key color volume. This approach has the advantage that a smaller look-up table size can be used to describe the key color volume with the same accuracy.

There are several methods that can be used to populate the three-dimensional look-up table based on the distribution of key colors. One method of characterizing the distribution of key color values is to store a list of key color values that occurred in a calibration image. In this case, the three-dimensional look-up table can be populated by simply tagging every look-up table cell that contains at least one of the key color values in the list as being within the key color volume. Many variations of this approach can also be used. For example, look-up table cells that contain at least two occurrences of key color values in the list can be tagged as being within the key color volume. Alternatively, the envelope of all of the key color values in the list can be determined, and any look-up table cell within the convex hull can be tagged as being within the key color volume. (In mathematical terms, the "envelope" of all of the key color values would be equivalent to a "convex hull" of the key color values.) This would have the advantage of eliminating any "holes" that might occur within the key color volume otherwise. In some cases, it may be desirable to enlarge the key color volume slightly to decrease the probability that a key color region is mislabeled as a foreground region. This can be done by tagging look-up table cells that were within a certain distance of the key color values in the list as being within the key color volume.

If statistical measures were used to characterize the distribution of key color values, a somewhat different approach would need to be used to populate the three-dimensional look-up table. For example, consider the case where the key color values are assumed to be represented using a three-dimensional Gaussian distribution, and are characterized by the centroid of the key color values and a set of standard deviations. The key color volume can be defined by the color values that fall within a certain number of standard deviations of the centroid. The corresponding cells of the three dimensional look-up table can then be tagged as being within the key color volume.

A different type of statistical measure would simply be the range of key color values that occurred within the calibration image. For example, if the distribution of key color values were characterized by the minimum and maximum Y values, $C_r$ values, and $C_b$ values the three-dimensional look-up table cells that fall within these intervals would be tagged as being within the key color volume. As before, it may be desirable in some cases to enlarge the key color volume slightly to decrease the probability that a key color region is mislabeled as a foreground region Likewise, the range of key color values can be determined relative to a polar coordinate system so that minimum and maximum Y values, hue values ($\tan-1(C_b/C_r)$), and chroma values $(C_r^2+C_b^2)^{1/2}$ are determined. The three-dimensional look-up table cells that fall within these intervals would be tagged as being within the key color volume. As mentioned above, it may be desirable to enlarge the key color volume slightly to decrease the probability that a key color region is mislabeled as a foreground region. In particular, when polar coordinates are being used, it may be desirable to increase the maximum chroma limit to infinity since it is unlikely that there will be any subject color that is more saturated than the key color.

One particular reason that it may be desirable to enlarge the key color volume as mentioned above is to account for cases where the key color backdrop may be shadowed by the foreground subject when the image is captured. Since the distribution of key color values is commonly characterized by capturing an image of the key color backdrop with no foreground objects, the associated key color volume may not contain color values associated with shadowed key color regions. In many cases, it will be desirable to idenfify such shadowed areas of the key color backdrop as belonging to the key color region. There are several ways that the key color region can be enlarged to account for the shadowed key color regions. For example, a calibration image can be captured where a shadowed area on the key color backdrop is intentionally introduced. Alternatively, the user can be given a tool to indicate a shadowed key color region in the image to characterize the distribution of shadowed key color values.

A mathematical model can also be used to predict the color values of the shadowed key color region from the distribution of key color values for the unshadowed key color region. Such a mathematical model might be derived from well-known color science relationships, or alternatively, a set of parameterized equations can be used. Consider the example shown in FIG. 5. A projection of a typical unshadowed key color volume 50 onto the chrominance plane is shown. In this case, the key color volume has an associated unshadowed hue angle range 52. A similar projection of a corresponding shadowed key color volume 54 is shown for comparison. In addition to the fact that the shadowed key color region gets darker, it can be seen from this figure that the range of chroma values and hue angles also changes substantially. For example, the associated shadowed hue angle range 56 is larger than the unshadowed hue angle range 52 and the center of the range is shifted in the clockwise direction. Since shadowed key color regions will typically be darker than unshadowed key color regions, the hue angle range and chroma range of the key color volume can be adjusted as functions of the luminance value to account for the observed difference in the shape and/or position of the shadowed and unshadowed key color volumes. In one embodiment of the present invention, the upper and lower hue limits and chroma limits associated with the key color volume are modified using a set of predetermined offsets when luminance values fall below the lower limit of the luminances for the unshadowed key color volume.

During the key color volume defining step 32, the cells in the multi-dimensional look-up table that are within the key color volume will typically be labeled with a particular value to indicate that the associated color value is a key color value. For example, all of the cells within the key color volume can be uniformly set to 1. Likewise, the cells in the multi-dimensional look-up table that are outside the key color volume can be set to another value such as 0. However, in some cases, it might be desirable to store non-uniform values in the key-color and/or non-key color regions of the multi-dimensional look-up table. For example, the values for the cells in the multi-dimensional look-up table that are outside the key color volume can be set to a value in the range 0 to 1 where the stored value is an indication of how far outside the chroma key volume each color value is located. Although this information is typically not necessary for the segmentation step 12, it may be useful information for certain implementations of the transition signal creation step 14.

Once the multi-dimensional look-up table has been populated to reflect the defined key color volume, the next step is to use the multi-dimensional look-up table to test whether color values in an image fall within the key color volume. This is accomplished using the multi-dimensional look-up table addressing step 34 to determine an output value, followed by a pixel labeling step 36. In the multi-dimensional look-up table addressing step 34, these steps will be applied to the color value for each pixel in an image that contains both a key color region and a foreground region. The color value for each pixel is used to address the multi-dimensional look-up table. Since the size of the multi-dimensional look-up table will typically be smaller than the number of possible input color values, it is usually necessary to determine which cell within the look-up table contains the input color value. For example, if the input color values were 8-bit values in the range 0 to 255, and a 32×32×32 look-up table were used to characterize the key color volume, then the input color values can be grouped into 32 bins corresponding to the size of the multi-dimensional look-up table before addressing the multi-dimensional look-up table. Alternatively, interpolation techniques, such as tri-linear interpolation or tetrahedral interpolation, can be used to estimate the intermediate output values. The output value determined by addressing the multi-dimensional look-up table can now be used to determine whether the particular pixel belongs to the key color region or the foreground region. If uniform output values are stored in the multi-dimensional look-up table for colors in the key color region, it is simply necessary to test whether the output value is equal to the expected output value for the key color region. If non-uniform values are used, it may be necessary to compare the output value to some threshold output value to determine the appropriate image region.

Once it has been determined whether a pixel in the digital image belongs to the key color region or the foreground region, the final step is to label the pixel accordingly. Typically this is done by creating a mask image that contains binary values indicating the status of each pixel in the digital image. Such mask images are sometimes referred to as "alpha channels."

Figure 6:
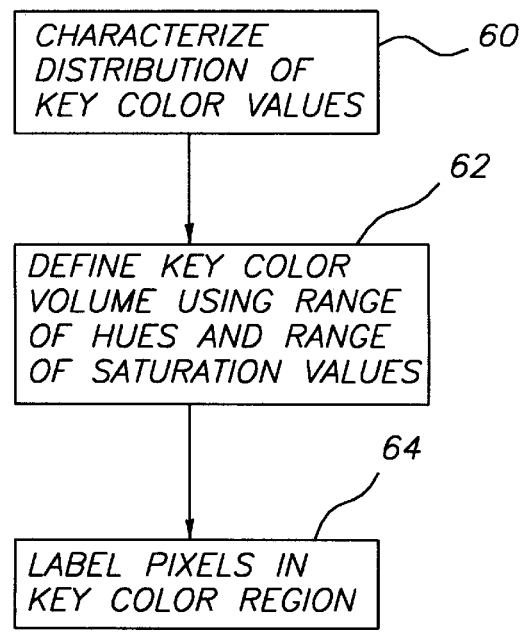
FIG. 6 is a flow diagram illustrating another preferred embodiment of the present invention.

In some cases, it may be desirable to implement these techniques with methods that do not rely on multi-dimensional look-up tables. For example, the method described above that uses ranges of hue angles and chroma values can be used to directly test whether image pixels are within the key color volume, rather than using the ranges to populate the multi-dimensional look-up table. This method is shown schematically in FIG. 6. The key color value distribution characterization step 60 is completely analogous to step 30 in FIG. 3. However, instead of defining the key color volume using a multi-dimensional look-up table, a key color volume defining step 62 is used to define the key color volume using ranges of hues and chroma values. Finally, pixels in the digital image are tested against the key color volume using a key color region labeling step 64.

Figure 5:
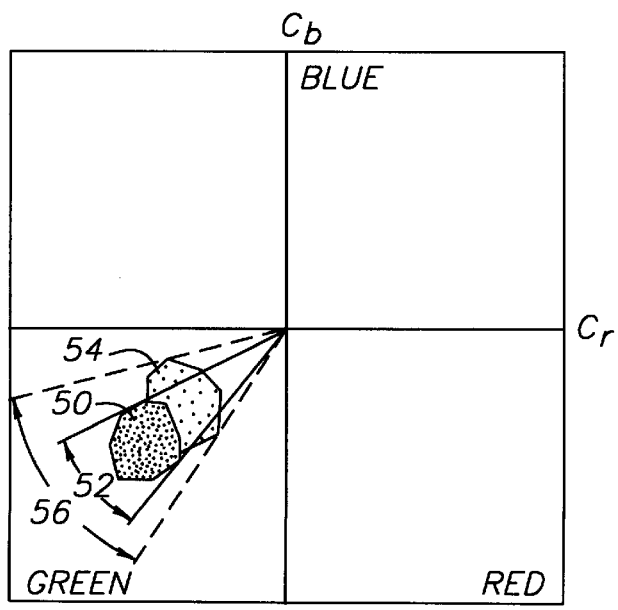
FIG. 5 is a diagram showing a projection of an unshadowed key color volume and a corresponding shadowed key color volume into a chrominance plane.
Figure 7:
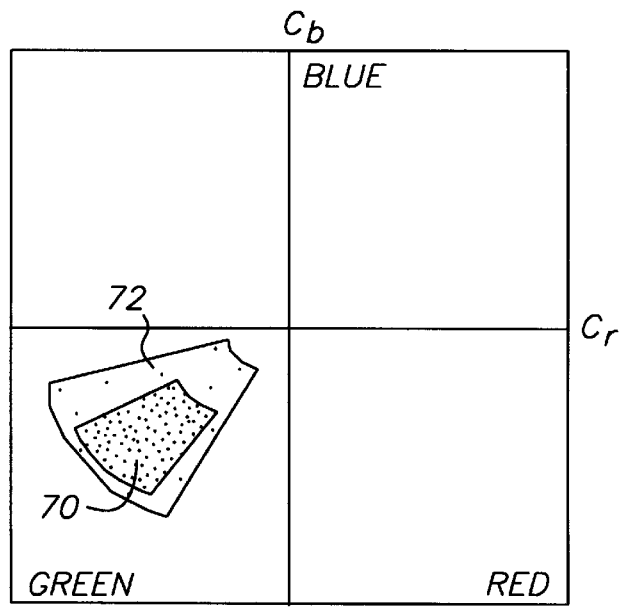
FIG. 7 is a diagram illustrating a projection of an unshadowed key color volume and a corresponding shadowed key color volume into a chrominance plane.
Figure 8:
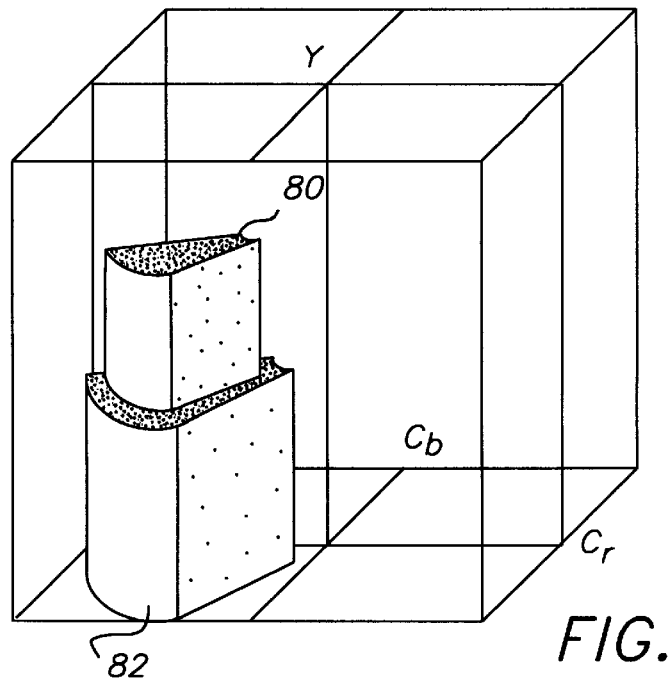
FIG. 8 is a diagram showing an unshadowed key color volume and a corresponding shadowed key color volume.

As mentioned above, it is frequently desirable to have the hue angle and chroma ranges be a function of the luminance signal. This is particularly useful for handling shadowed key color regions. For example, FIG. 7 shows an example of a unshadowed key color volume 70 that has been defined using a hue angle range and a chroma range. These ranges would be appropriate for the range of luminance values associated with unshadowed areas of the key color backdrop. As was shown in. FIG. 5, the distribution of colors in the shadowed areas of the key color backdrop have significantly different ranges of hue angles and chroma values. A shadowed key color volume 72 can be defined to reflect these ranges. Since the shadowed regions will be darker than the unshadowed regions, the shadowed key color volume can be applied for color values whose luminance value is lower than that associated with the unshadowed areas. FIG. 8 is a three-dimensional representation of these same key color volumes. In particular, a unshadowed key color volume 80 and a shadowed key color volume 82 are shown. It can be seen that the hue angle and chroma ranges have been modified as a function of the luminance value. In this example, the hue angle and chroma ranges jump from a first set of values to a second set of values at a particular luminance value. In general, the hue angle and chroma ranges can be adjusted continuously to provide a smooth transition. It will be obvious to one skilled in the art that the variations described above relative to the multi-dimensional look-up table implementation can also be applied to the method of FIG. 6 as well.

Figure 9:
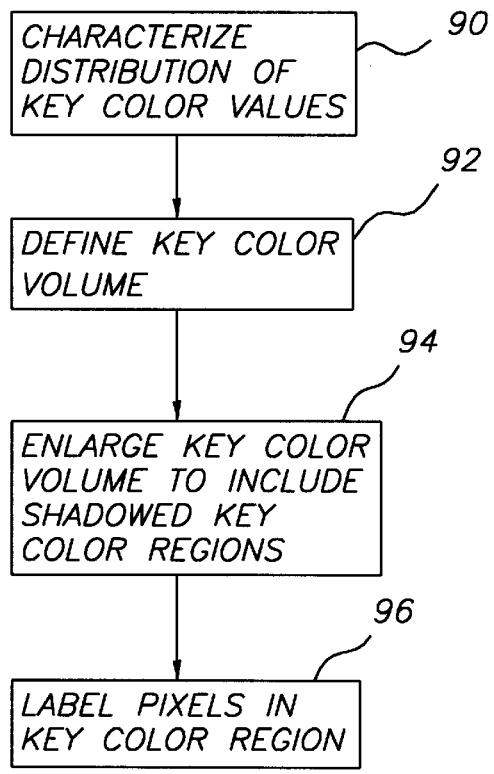
FIG. 9 is a flow diagram illustrating another preferred embodiment of the present invention.

No matter what method is used to define the key color volume, it will be important in many applications to account for shadowed areas of the key color backdrop. This point was discussed above for the multi-dimensional look-up table implementation, as well as the hue angle/chroma value range implementation. FIG. 9 shows a flow diagram for a generalized method that can be used to account for shadowed areas of the key color backdrop independent of the method that is used to define the key color volume. First, a key color value distribution characterization step 90 is used to characterize the distribution of key color values in an unshadowed key color region. Next, a key color volume defining step 92 is used to define a key color volume based on the characterized distribution of key color values. The key color volume can be defined using a multi-dimensional look-up table, a hue angle/chroma value range model, or some other method of describing a volume in color space. The defined key color volume is then enlarged using a key color volume enlarging step 94 to account for the shadowed key color regions. As discussed above, a mathematical model might be derived from well-known color science relationships, or alternatively, a set of parameterized equations can be used to determine the shape of the enlarged key color volume. Other methods for determining the shape of the enlarged key color volume may include analyzing a shadowed key color region in a calibration image, or in an actual image containing foreground objects. Finally, a key color pixel labeling step 96 is used to test whether pixels in an input image are in the key color region or the foreground region of the image.

It will be understood to those skilled in the art that a computer program product having a computer program stored therein can be used for segmenting a digital image into a foreground region and a key color region. The computer program product may comprise, for example, magnetic storage media such as a magnetic disk (floppy disk) or magnetic tape; optical storage media such as optical disks, optical tape and solid state storage devices such as random access memory (RAM); read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST 10 image capture step
12 segmentation step
14 transition signal creation step
16 image composition step
20 half-plane key color zone
22 circular key color zone
24 wedge shaped key color zone
26 diamond key color zone
30 key color value distribution characterization step
32 key color volume defining step
34 multi-dimensional look-up table addressing step
36 pixel labeling step
40 multi-dimensional look-up table
42 look-up table cells
44 key color volume
50 unshadowed key color volume
52 unshadowed hue angle range
54 shadowed key color volume
56 shadowed hue angle range
60 key color value distribution characterization step
62 key color volume defining step
64 key color region labeling step
70 unshadowed key color volume
72 shadowed key color volume
80 unshadowed key color volume
82 shadowed key color volume
90 key color value distribution characterization step
92 key color volume defining step
94 key color volume enlarging step
96 key color pixel labeling step

What is claimed is:

1. A method for segmenting a digital image into a foreground region and a key color region comprising the steps of:

a) characterizing a distribution of key color values;

b) using the distribution of key color values to produce a multi-dimensional look-up table having three or more dimensions indexed by color values in a selected color space to defme a key color volume;

c) addressing the multi-dimensional look-up table with color values of pixels in the digital image to determine whether the color values of such pixels are within the key color volume; and d) labeling pixels in the digital image whose color values fall within the key color volume to be within the key color region and labeling all other pixels to be within the foreground region whereby the digital image is segmented into the foreground region and the key color region.

2. The method of claim 1 wherein the digital image is obtained from a digital camera.

3. The method of claim 1 wherein the digital image is obtained from a video camera.

4. The method of claim 1 wherein the digital image is obtained from a digitized photograph.

5. The method of claim 1 wherein step a) includes determining the distribution of color values in a digital calibration image that contains no foreground objects.

6. The method of claim 5 where the digital calibration image includes a shadowed key color region.

7. The method of claim 1 wherein step a) includes determining the distribution of key color values by analyzing a subset of the key color region in the digital image.

8. The method of claim 7 wherein the key color region is identified by a user.

9. The method of claim 1 wherein step a) includes having a user adjust a set of parameter values that characterize the distribution of key color values.

10. The method of claim 1 wherein the pixels in the digital image are labeled by an output value of the multi-dimensional look-up table.

11. The method of claim 1 wherein the selected color space comprises a luminance value and two chrominance values.

12. The method of claim 11 wherein the color space is CIELAB.

13. The method of claim 11 wherein the color space is YCrCb.

14. The method of claim 1 wherein the key color volume is defined by the envelope of the distribution of the key color values.

15. The method of claim 1 wherein the key color volume is defined by enlarging the envelope of the distribution of key color values.

16. The method of claim 15 wherein the envelope of the distribution of key color values is enlarged to include color values corresponding to shadowed key color regions.

17. The method of claim 1 wherein a range of hue angles is used to define the key color volume.

18. The method of claim 17 wherein the range of hue angles is a function of a luminance signal.

19. The method of claim 1 wherein a range of chroma values is used to define the key color volume.

20. The method of claim 19 wherein the range of chroma values is a function of a luminance value.

21. A method for segmenting a digital image into a foreground region and a key color region comprising the steps of:

a) characterizing a distribution of key color values;

b) using the distribution of key color values to define a key color volume in a selected color space where the key color volume is characterized by a range of hue angles and a range of chroma values wherein at least one of such ranges is a function of a luminance value; and c) labeling pixels in the digital image whose color values fall within the key color volume to be within the key color region and labeling all other pixels to be within the foreground region whereby the digital image is segmented into the foreground region and the key color region.

22. The method of claim 21 wherein step a) includes determining the distribution of color values in a digital calibration image that contains no foreground objects.

23. The method of claim 22 where the digital calibration image includes a shadowed key color region.

24. The method of claim 21 wherein step a) includes determining the distribution of key color values by analyzing a key color region in the digital image.

25. The method of claim 24 wherein the key color region is identified by a user.

26. The method of claim 21 wherein step a) includes having a user adjust a set of parameters that characterize the key color volume.

27. The method of claim 21 wherein the selected color space comprises a luminance value and two chrominance values.

28. The method of claim 27 wherein the color space is CIELAB.

29. The method of claim 27 wherein the color space is YCrCb.

30. The method of claim 21 wherein the key color volume is defined by the envelope of the distribution of the key color values.

31. The method of claim 21 wherein the key color volume is defined by enlarging the envelope of the distribution of key color values.

32. The method of claim 31 wherein the envelope of the distribution of key color values is enlarged to include color values corresponding to shadowed key color regions.

33. A method for segmenting a first digital image into a foreground region and a key color region and composing the foreground region of the first digital image with a background digital image to produce a composite digital image comprising the steps of:

a) characterizing a distribution of key color values;

b) using the distribution of key color values to produce a multi-dimensional look-up-table having three or more dimensions indexed by color values in a selected color space to define a key color volume;

c) addressing the multi-dimensional look-up table with color values of pixels in the digital image to determine whether the color values of such pixels are within the key color volume;

d) labeling pixels in the digital image whose color values fall within the key color volume to be within the key color region and labeling all other pixels to be within the foreground region whereby the digital image is segmented into the foreground region and the key color region; and e) combining the first digital image with a background digital image using the segmented regions to produce the composite digital image.

34. A method for segmenting a first digital image into a foreground region and a key color region and composing the foreground region of the first digital image with a background digital image to produce a composite digital image comprising the steps of:

a) characterizing a distribution of key color values;

b) using the distribution of key color values to define a key color volume in a selected color space where the key color volume is characterized by a range of hue angles and a range of chroma values wherein at least one of such ranges is a function of a luminance value;

c) labeling pixels in the digital image whose color values fall within the key color volume to be within the key color region and labeling all other pixels to be within the foreground region whereby the digital image is segmented into the foreground region and the key color region; and d) combining the first digital image with a background digital image using the segmented regions to produce the composite digital image.

35. A computer program product having a computer program stored therein for segmenting a digital image into a foreground region and a key color region comprising the steps of:

a) characterizing a distribution of key color values;

b) using the distribution of key color values to produce a multi-dimensional look-up-table having three or more dimensions indexed by color values in a selected color space to define a key color volume;

c) addressing the multi-dimensional look-up table with color values of pixels in the digital image to determine whether the color values of such pixels are within the key color volume; and d) labeling pixels in the digital image whose color values fall within the key color volume to be within the key color region and labeling all other pixels to be within the foreground region whereby the digital image is segmented into the foreground region and the key color region.

36. A computer program product having a computer program stored therein for segmenting a digital image into a foreground region and a key color region comprising the steps of:

a) characterizing a distribution of key color values;

b) using the distribution of key color values to define a key color volume in a selected color space where the key color volume is characterized by a range of hue angles and a range of chroma values wherein at least one of such ranges is a function of a luminance value; and c) labeling pixels in the digital image whose color values fall within the key color volume to be within the key color region and labeling all other pixels to be within the foreground region whereby the digital image is segmented into the foreground region and the key color region.

37. A computer program product having a computer program stored therein for segmenting a digital image into a foreground region and a key color region comprising the steps of:

a) characterizing a distribution of key color values;

b) using the distribution of key color values to produce a multi-dimensional look-up-table having three or more dimensions indexed by color values in a selected color space to define a key color volume;

c) addressing the multi-dimensional look-up table with color values of pixels in the digital image to determine whether the color values of such pixels are within the key color volume;

d) labeling pixels in the digital image whose color values fall within the key color volume to be within the key color region and labeling all other pixels to be within the foreground region whereby the digital image is segmented into the foreground region and the key color region; and e) combining the first digital image with a background digital image using the segmented regions to produce the composite digital image.

38. A computer program product having a computer program stored therein for segmenting a digital image into a foreground region and a key color region comprising the steps of:

a) characterizing a distribution of key color values;

b) using the distribution of key color values to define a key color volume in a selected color space where the key color volume is characterized by a range of hue angles and a range of chroma values wherein at least one of such ranges is a function of a luminance value;

c) labeling pixels in the digital image whose color values fall within the key color volume to be within the key color region and labeling all other pixels to be within the foreground region whereby the digital image is segmented into the foreground region and the key color region; and d) combining the first digital image with a background digital image using the segmented regions to produce the composite digital image.

* * * * *